April 26, 1955
L. THIBAUT
2,707,163
METHOD FOR THE TREATMENT OF SOLID OR LIQUID CARBONACEOUS MATERIALS
Filed Feb. 3, 1945
5 Sheets-Sheet 1
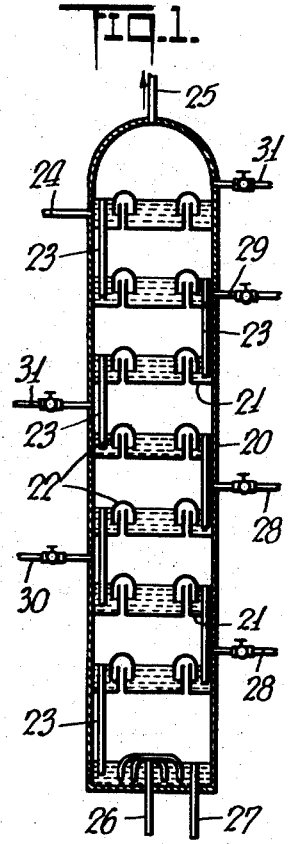
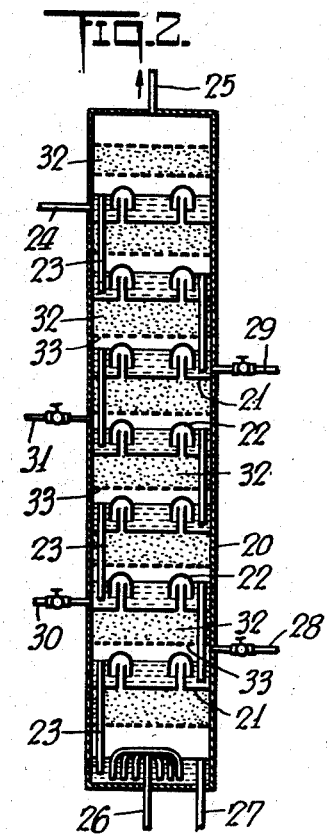
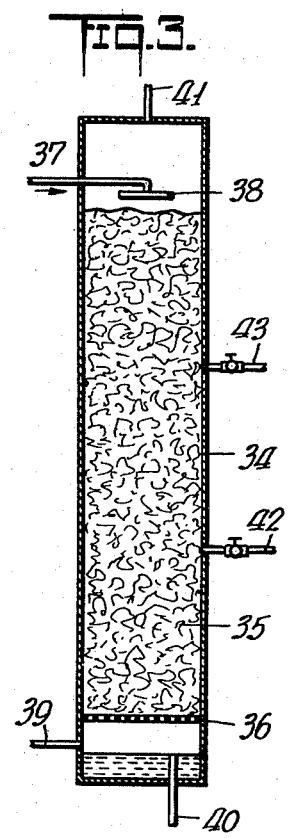
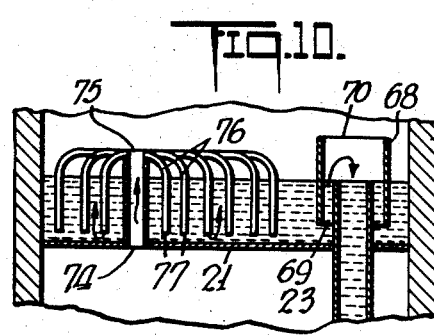
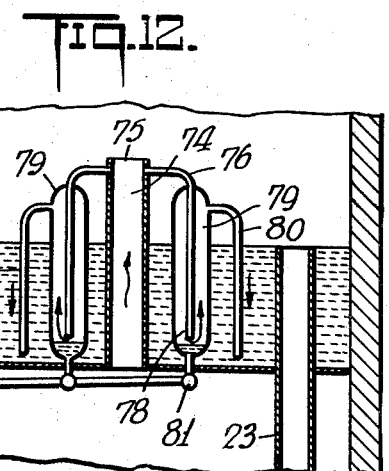
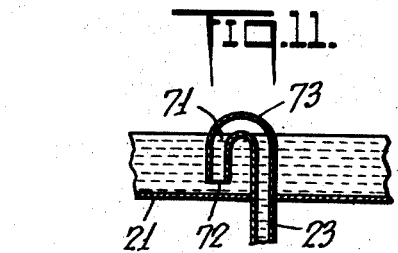
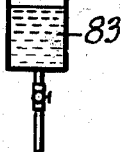
INVENTOR
Louis Thibaut
BY
Dean Fairbank & Hirsch
ATTORNEYS

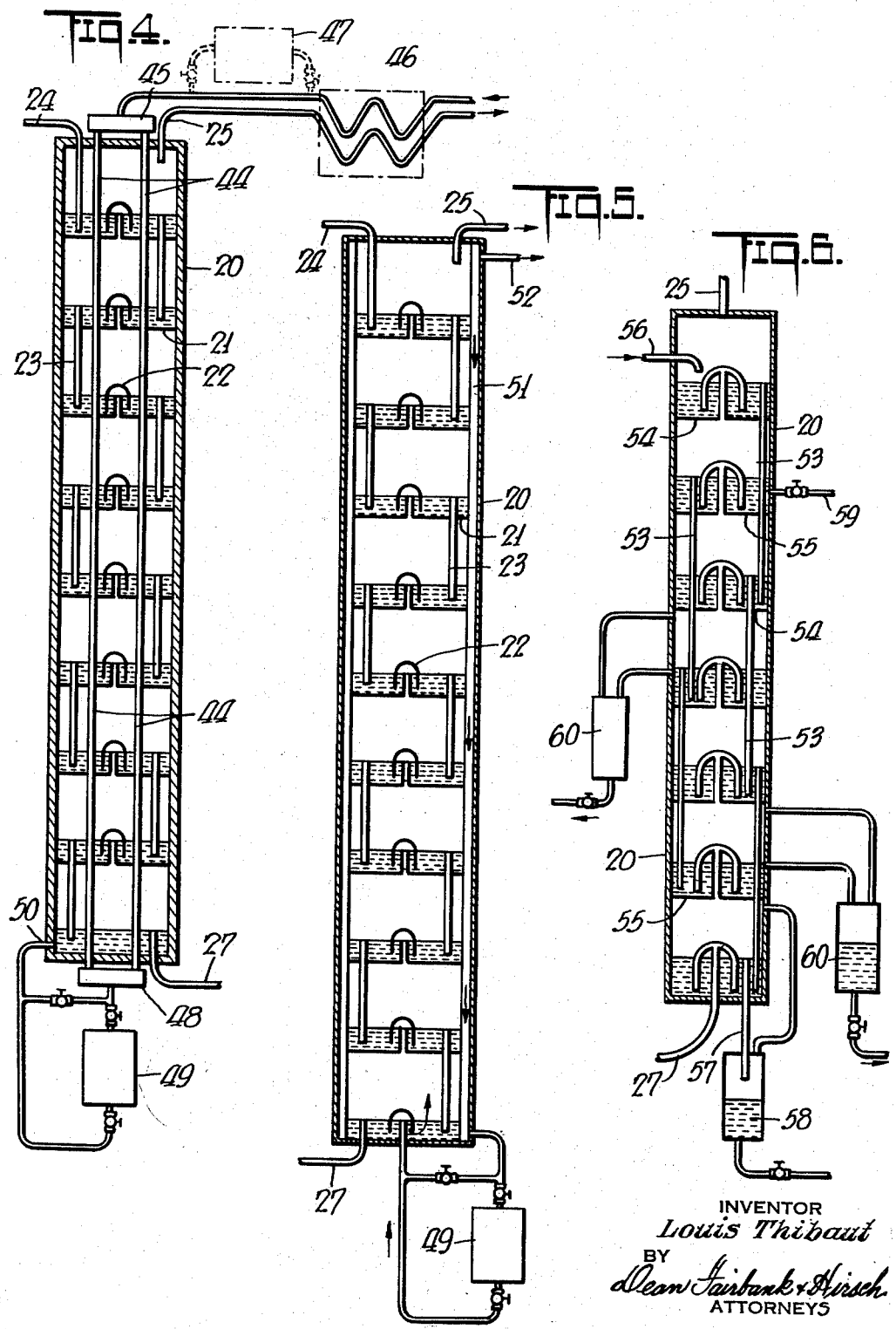

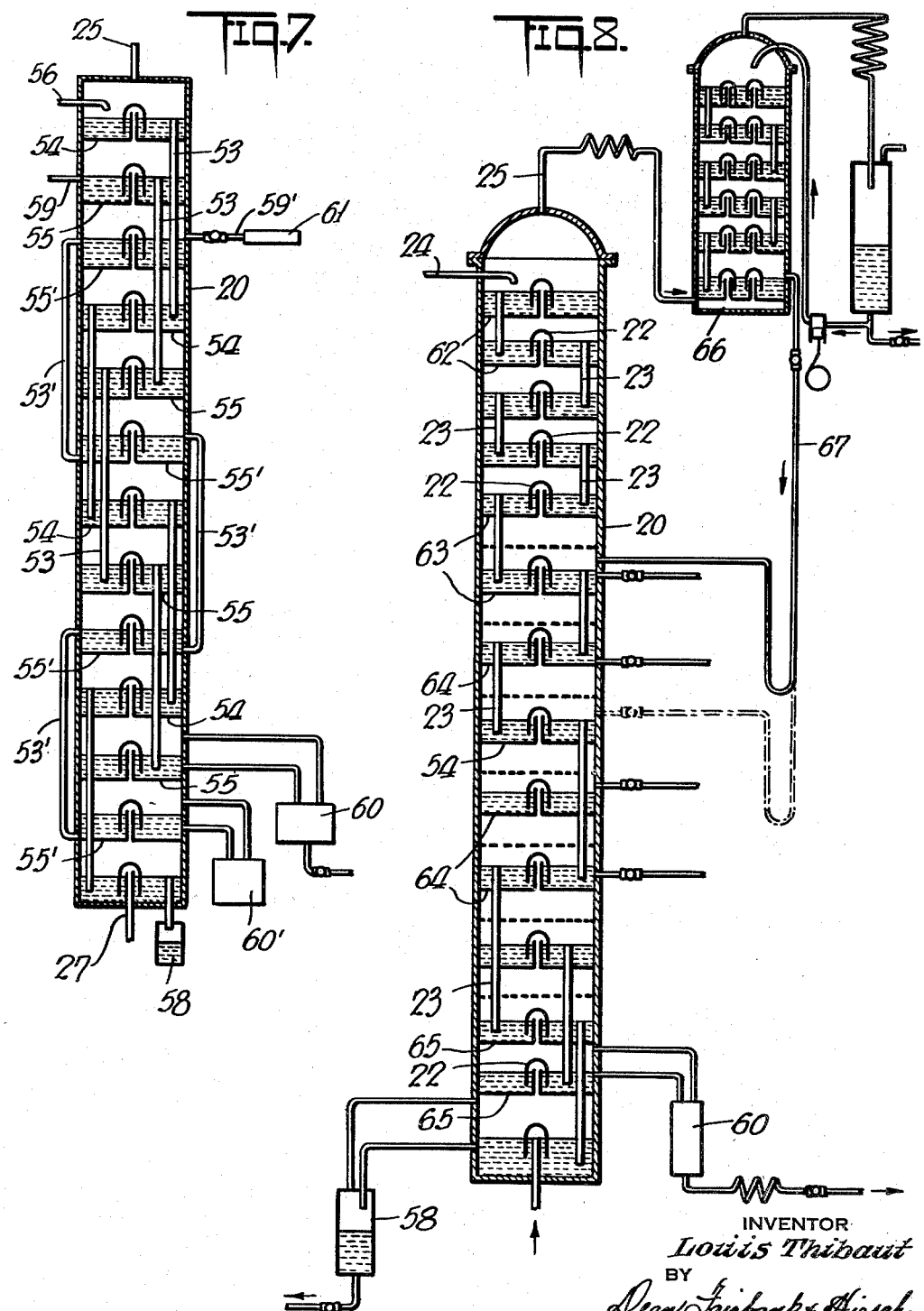

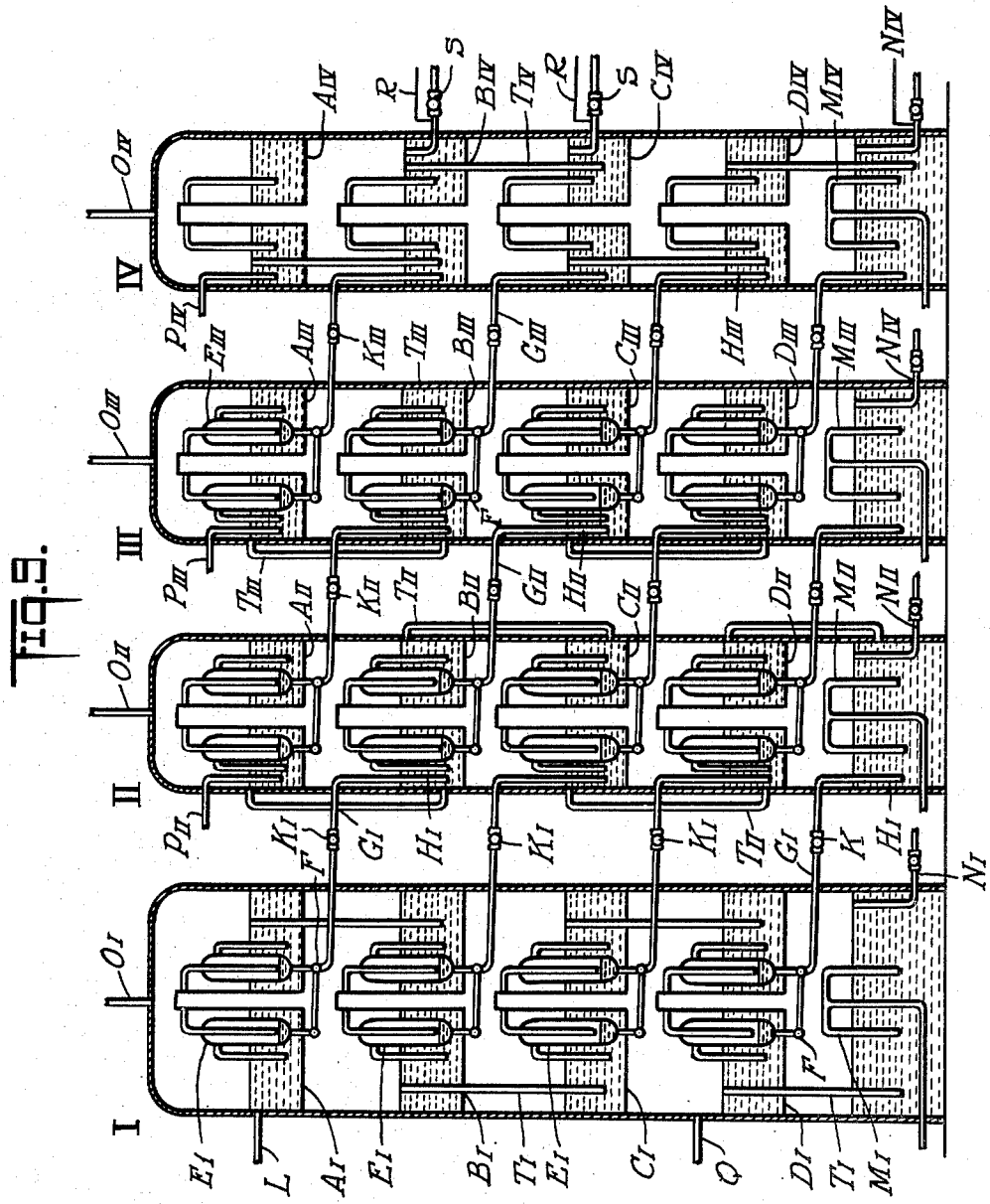

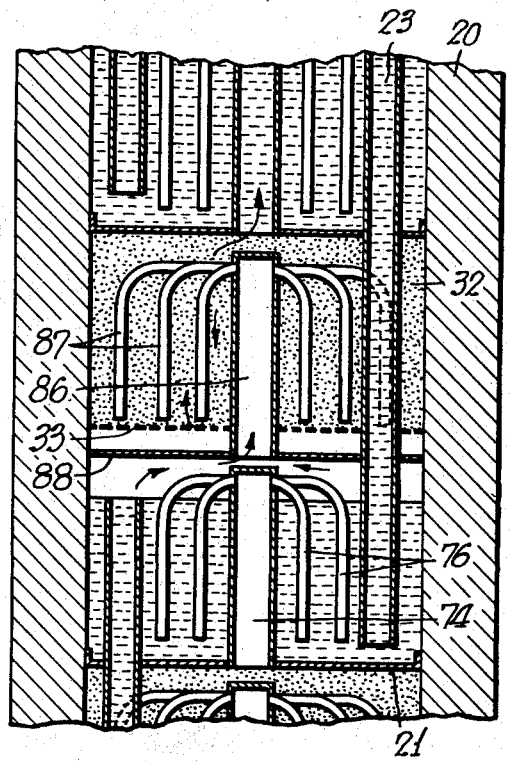
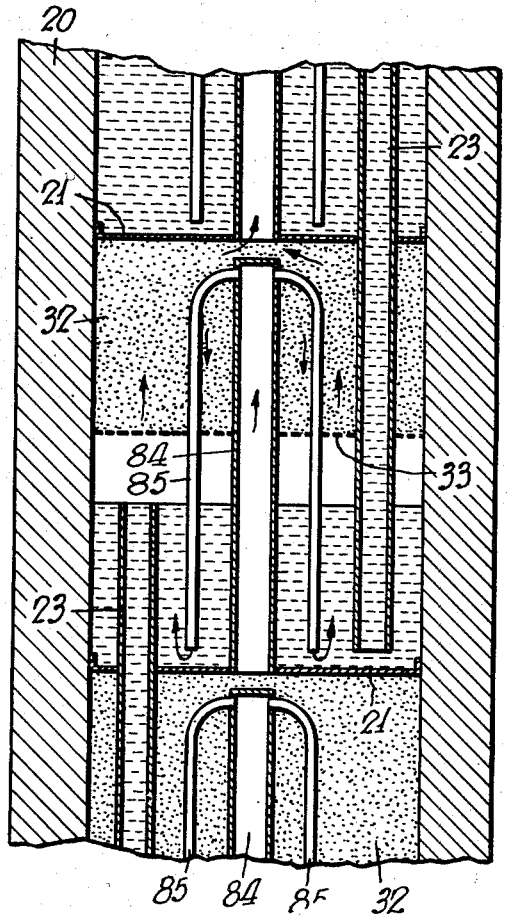
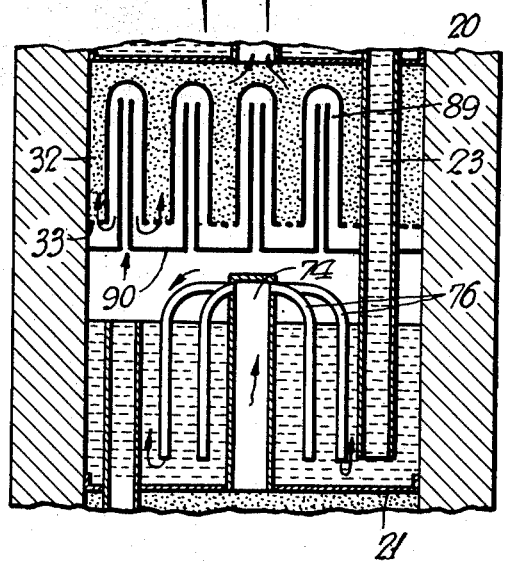

United States Patent Office 2,707,163
Patented Apr. 26, 1955

2,707,163

METHOD FOR THE TREATMENT OF SOLID OR LIQUID CARBONACEOUS MATERIALS

Louis Thibaut, Souchez, France, assignor to Compagnie Francaise des Essences Synthetiques Societe Anonyme, Paris, France, a corporation of France Application February 3, 1945, Serial No. 576,133
In France August 17, 1939

Section 1, Public Law 690, August 8, 1946
Patent expires August 17, 1959

1 Claim. (Cl. 196—49)

The present invention relates to a method applicable to the treatment of solid or liquid carbonaceous materials such as coal, lignite, peat, oil-bearing products, primary tars or tars of a high temperature, lignite tars, heavy or middle oils, bituminous shale or asphaltic limestone oils for transformation into products of high value such as, motor-fuels or substitutes, or for the production of special motor-fuels such as iso-octanes and homologues, alcohols, ethers, ketones and the like.

This method consists in effecting simultaneously in one and the same space the chemical treatment of the carbonaceous materials, their concomitant fractional distillation and the separation of the various products resulting from this treatment.

By effecting, in the same space, the chemical treatment, the fractional distillation and the separation of the materials or products resulting from the treatment, zones are produced, in the said space, in which the physico-chemical conditions are different and the reactions of transformation to which the materials selected by the fractional distillation and the separation are submitted are separated and occur in a plurality of successive phases. Furthermore, the lighter products resulting from the treatment are separated as soon as they are formed and carried along towards regions which are less active than those where they have been formed and thus protected against too far-reaching transformations. Thus, one avoids more particularly the formation of incondensable hydrocarbons and the releasing of carbon.

The combined fractional distillation and selective treatment act at the same time on the materials to be treated and on the obtained products. One obtains thus directly without any previous or subsequent distillation operation the total transformation of the starting material as well as the separation and the classification of the treated products. The treatment is carried out in a single operation and in a single apparatus, which avoids the necessity of resorting to complicated and expensive plants as well as the limitations resulting from the simultaneous control of distinct apparatus.

The successive transformations of the products occur continuously without the need for transfer or any intermediate periods of rest and, accordingly, without the possibility of any undesired physical or chemical transformation.

The chemical treatment of the carbonaceous materials can be a thermal treatment, a catalytic treatment or a combined thermal and catalytic treatment. The method is more particularly applicable to the thermal or catalytic treatment of carbonaceous materials or to their hydrogenation or to any other treatment.

As the fractional distillation of the products proceeds it is possible to submit the said products (starting products and products of transformation) to different concomitant treatments adapted to their composition resulting from the said fractional distillation as well as to the physico-chemical conditions in which they are formed.

The successive treatments can be effected in the presence of catalysers. In a liquid medium the said catalysers are either incorporated with the products to be treated or disposed in a fixed manner in each treatment zone. In a gaseous medium they are placed in the path of travel of the gaseous current. They can be of the same kind in all the zones of the treatment space. However, owing to the selection which is progressively produced, it is preferable to use, in the successive treatment zones, catalysers of different compositions especially adapted to the definite compositions of the products which they receive and to the temperatures to which they are brought. It is also possible to use gaseous catalysers incorporated with the mixture of products in circulation or introduced at any suitable point of the treatment space.

The operation can be performed either in successive stages as, for instance, in a column of the kind of the distillation columns or in a continuous and progressive manner as, for instance, in a vertical tower.

Whether the circulations occur from one stage to another or in a continuous manner the products to be treated, which may be liquids or solids in suspension in a suitable liquid, with or without moderate preheating and introduced into the treatment space either in the upper part or at one or more other judiciously chosen points, constantly flow into the said space. A current of inert, catalytic, reducing or oxidising gaseous products (flue gases, steam, hydrogen, hydrocarbons, water gas, coke oven gas and the like) is preheated and led to the lower part whereafter it travels through the treatment space in a counter-current with respect to the treated materials.

In the treatment space normal working temperatures establish themselves which are variable and increasing from top to bottom and at which the chemical treatments and successive fractional distillations take place and to which the different compositions of the mixture in the course of treatment correspond. The products which are treated at a predetermined temperature and consequently lightened are immediately separated from the downward circulation of the carbonaceous material and carried along with the ascending gaseous current so that there is no danger that they may be destroyed and transformed into incondensable hydrocarbons. The starting materials are gradually exhausted in the course of their downward circulation; they can be treated at a high temperature in the lower part of the treatment space without danger of any formation of coke or incondensable hydrocarbons. Thus residues are obtained which are very concentrated especially in mineral materials when the starting products contain some, and these materials can be removed directly without any subsequent operation.

The sulphur which may be contained in the carbonaceous materials can be removed in the upper parts of the treatment space especially in the form of hydrogen sulphide if the treatment is effected in the presence of hydrogen. Therefore, the products which have been treated in the lower parts of the apparatus are practically free of sulphur and the treatment is carried out in the absence of this product. When catalysers are used, one may advantageously provide catalysers resistant to sulphur only in the upper zones of the treatment space and provide, in the lower parts, catalysers sensitive to sulphur which latter, having previously been removed, no longer impairs their effectiveness.

On the contrary, in case the presence of sulphur promotes the reaction when in well defined proportions, it is possible to reintroduce a known and measured quantity of it into the lower part of the treatment space or at any other point of the latter.

In like manner, the water contained in the products or formed in the course of the reaction is removed by the fractional distillation and carried along towards the upper parts of the apparatus, which avoids its presence in the lower parts.

It is also possible to inject steam into the lower part of the apparatus in a well defined quantity if the presence of this agent is necessary.

In the application of this methol the treatment operations can take place in a liquid or in a gaseous medium. It can be advantageous to submit the carbonaceous materials, in the same space, to combined treatments in successive stages in a liquid medium and in a gaseous medium, the treatment in the gaseous medium acting upon the lightened products coming from the treatment in the liquid medium and leading the treated products to the double treatment of the following stage.

The sequence of the double treatments in several stages can be combined with a treatment effected only in a liquid medium or in a gaseous medium and either before or after or simultaneously before and after the previous treatments, all these treatments being performed in the same space.

Any additional preheated or non-preheated materials can be introduced into the different stages or into the different zones of fractional distillation in any desired quantity for directing, promoting or retarding the reactions. These materials can be inert or active, and of the same kind as the materials to be treated or different from them. It is also possible to provide additions of suitable chemical agents for simultaneously insuring an accessory treatment such as a purification, a separation by means of solvents, or a refining operation, for instance.

Owing to their temperature and also to their quantity and their kind, they allow of performing all the desired adjustments.

Liquid or gaseous samples can be taken out from any point of the treatment space yielding treated and fractionally distilled or even rectified and refined products in the corresponding stage and doing away with any subsequent operation for making the best of the products. This sampling can be performed either by drawing off, at any suitable point, a gaseous mixture from which the oils are obtained after the condensation or by effecting a separation inside the treatment apparatus itself and by drawing off the separated oils from the apparatus and directly in a liquid condition.

In this latter case means are provided, at various points of the treatment space and more particularly in all the treatment stages or only in certain stages, which insure the condensation by mixing or the surface condensation of the vapors which pass through the said stage. After having been freed from the condensed parts the gaseous products pursue their ascending circulation, while the condensed products are taken off from the treatment space.

The separation of the products can also take place in the treatment space through solutiton in suitable solvents which are introduced and removed at any convenient point.

The products already selected can be immediately collected. They can also be submitted to a rectification or to a farther reaching treatment.

More particularly the concomitant treatment and fractional distillation of the carbonaceous materials can be combined with a fractional distillation without treatment performed in the same space above or below the zone of combined treatment and fractional distillation or inserted in the said zone.

For carrying out the method the treatment space can be formed either of a single treatment chamber or of a plurality of similar chambers united together and arranged in series, in parallel or in series-parallel.

In the case of a single chamber the stages or successive treatment and fractional distillation zones can be connected with one another in order to insure one or a plurality of distinct circulations of the carbonaceous materials to be treated in combination with one or a plurality of circulations of the gaseous mixture. Thus, more particularly, the treatment stages, although arranged in series on the travel of the gaseous mixture which passes successively through them, can be connected in groups receiving products of the same kind or different products and insuring distinct parallel circulations. The stages of the various groups, which overlap one another, are connected so that they are arranged in series according to the scale of the temperatures of the treatment space while insuring the treatment and the fractional distillation on different products in distinct circulations. Furthermore, suitable connections between the different stages can permit of the selective passage of the liquid or gaseous fractionally distilled products from one group to another, which insures a selective treatment of the selected products together with the progressive fractional distillation.

In case the treatment space is formed of a plurality of chambers the latter are connected with one another so that they insure one or a plurality of simultaneous or successive circulations for the treated materials through their passage in counter-current with one or more gaseous circulations, their selective separation in a plurality of stages in a progressive manner and the gradation of the reactions of transformation. These chambers can be arranged in series on the travel of a single gaseous circulation or in parallel on distinct gaseous circulations. The passage of the materials to be treated from one chamber to another or their travel in one and the same chamber can take place in series or in parallel from a single introduction of the starting materials in a continuous circulation in one of the chambers and parallel circulations derived from products which have been fractionally distilled in the other chambers, all the circulations being submitted to the fractional distillation and to the concomitant chemical treatment.

It is more particularly possible to cause the selected products to pass to the successive zones or stages of a first treatment chamber in which the concomitant fractional distillation is performed, then to a second chamber mounted in parallel with the first chamber, whereafter the products which have been selected in this second chamber are led to a third chamber and so on. Thus, the products resulting from the treatments effected in a plurality of stages in series are submitted to a novel treatment in parallel whereby they are refined and fractionally distilled anew, the products resulting from this novel treatment being led to a novel treatment in parallel so that a plurality of combined chemical treatments and fractional distillations are performed simultaneously together in series and in parallel. In the treatment spaces for the treatment in parallel the materials are submitted to treatments of the same kind or to different treatments.

This arrangement of the chambers in parallel can be performed by means of chambers in which the stages are connected in groups with distinct circulations in parallel.

According to this method it will be possible to effect different chemical treatments in the same space by grouping chambers or stages in parallel correlatively with the fractional distillation in each of them. It is thus possible, in one and the same plant, to combine a hydrogenation treatment with a thermal or catalytic cracking of the hydrogenated products or one or the other of the said treatments, or both, with a simple fractional distillation, a rectification or possibly a refining or a separation by means of solvents.

In each chamber or in each stage the treatment will be adapted to the composition of the products which are supplied to the said chamber or stage, this being effected in a very precise manner so that a particularly selective treatment may be obtained. The treatments can be effected in the presence of catalysers. It is advantageous, more particularly when it is desired to produce well differentiated reactions, to work with different catalysers in each chamber or in each stage.

With these dispositions the passage of the totality of the raw materials through the whole treatment space is avoided.

If the said materials are introduced into the first chamber or into a group of stages the following chambers or the other groups of stages are supplied only with already selected products. Any contact between the already refined products and the original products is done away with. There is no danger that the impurities contained in the latter defile the selected products or disturb the reactions in the following operations.

In the case of the treatment of solid materials the latter pass only through the first chamber or the first group, the following chambers or groups being mounted in parallel receiving only liquid products which, as their production progresses, are shielded from any possible action of the solid materials and more particularly of ashes.

Of course, the groups or treatment chambers mounted in parallel can be provided in any number. This number will be the higher the farther reaching the intended separation must be. This method is advantageously applicable to the treatment of oils by cracking, whereby the previous fractional distillation followed by a massive treatment of the collected fractions is substituted by a very graduated selective treatment in which each kind of product or each mixture with close limits of composition is submitted to the most suitable reactions, which substantially reduces the formation of low grade products and improves the yield of the operation. Furthermore, it is easy, with this method, to definitely protect the lightened products, as soon as they are formed, from the action of the medium in which they have been formed, through a selective passage through a medium of a different kind more suitable to the reaction to which they must be submitted. Combined with a refining simultaneously effected in the same treatment space this method allows also of directly collecting the selected and completely purified products.

In the double operation for the treatment and the fractional distillation according to the method which forms the subject matter of this invention the classification of the products, both those coming from the starting materials and those formed in the course of the treatment results more particularly from the thermal equilibrium which establishes itself in the treatment chamber or chambers. This equilibrium is produced, on the one hand, between the supply of thermal energy of the previously heated gaseous mixture introduced in the chamber and the heat evolved by the reactions, possibly with an external subsidiary supply of heat and, on the other hand, between the said energy and the refrigerating energy supplied by the carbonaceous materials to be treated which have been more or less preheated for this purpose.

The preheating of the carbonaceous materials to be treated is not indispensable. In certain cases it is sufficient to introduce said materials at ordinary temperature or slightly preheated into the upper part of the treatment space which renders unnecessary or simplifies the preheating operation which is usual with the other methods and which is often delicate because of the tendency of the carbonaceous materials to coke.

The temperature equilibrium is adjusted through the temperature and the delivered quantity of the materials, i. e. of the starting materials as well as the materials of addition which are introduced into the treatment space and through the choice of their zone of introduction.

Sometimes, however, this equilibrium is difficult to obtain and maintain in conditions which are sufficiently precise for insuring a well defined and stable progression of temperatures in the different zones of treatment in order to insure a selective classification of the products. This is more particularly the case when the reaction heat quantities are high. The carbonaceous materials which are introduced even at ordinary temperature cannot absorb the thermal energy which is evolved in the course of the treatment. It is then necessary to supply a refrigerating energy in order to insure the fractional distillation.

On the contrary, it can be necessary to supply an addition of heat at different points of the apparatus.

The adjustment of the temperatures is insured by means of a heating or cooling device mounted either inside or outside of the treatment space.

An advantageous arrangement consists more particularly in supplying the materials which are treated with the supplementary heating or cooling energy which is necessary for obtaining and maintaining the thermal equilibrium by means of all or of a portion of the gases or vapors intended for the treatment before their introduction into the treatment chamber or chambers.

Through a calorific exchange between these gases or vapors and the materials which are treated one obtains for the latter a cooling or a heating action which regularizes in a suitable manner the distribution of the temperatures adequate to the operation without the need for resort to external agents or at least while reducing the intervention of such agents.

Thus, to the ordinary means for the adjustment of the temperatures: preheating of the materials to be treated, preheating of the gaseous mixture, is added a supplementary means which consists in the previous calorific exchange between the circulation of the materials being treated and the gaseous products before the latter are mixed with the said materials for insuring the treatment proper. Furthermore, the calorific efficiency of the operation is substantially improved.

According to a form of execution, the gaseous mixture intended for insuring the reaction is caused to pass in a parallel flow with the current of the carbonaceous materials to be treated, whether the latter are liquids or suspensions of solid materials, and in the same direction, possibly after having been preheated. If the treatment reactions evolve a quantity of heat which is too high for a good thermal equilibrium the gaseous mixture is heated during its travel in a parallel flow with the liquid current and yields heat to the medium being treated, which facilitates the production and the maintenance of an increasing scale of temperatures allowing of the performance of the operation. After its travel in a parallel flow and in the same direction, it is sufficient, as the case may be, to cause the gaseous mixture to pass through a superheater in order to bring it to the temperature at which it must be introduced into the treatment space in order to flow in counter-current to the liquid flow and to mix with the materials to be treated.

According to a form of application of the method which forms the subject matter of the invention the treatment and the concomitant fractional distillation of the carbonaceous materials are effected in stages in a column furnished with plates similar to the distillation columns and provided with walls adapted for the pressures, the temperatures and chemical reactions which are used and possibly also with suitable heating means.

The products to be treated, which may be preheated or non-preheated, are introduced into the upper part of the said column or at any other point. A heating agent, or possibly a reaction agent, brought to the convenient temperature, is introduced into the lower part. In the column the carbonaceous materials to be treated fall from one plate to another and are fractionally divided in each stage. The products which have been fractionally divided in a stage are treated at the same time thermally or chemically in the same stage in a liquid or in a gaseous medium or simultaneously in both, and in the presence of catalysers or without the latter. The lightened products are carried along towards the plate immediately thereabove where they are selected and treated anew after bubbling. The heavy products which are not vaporized on a plate drop towards the lower stages until they reach a zone (temperature, medium) adapted for their transformation.

Catalysers may be provided on the plates of the column in the zone for the passage of the liquid or between the plates in the zone for the treatment in a gaseous medium or in both places simultaneously and for the totality or only a part of the said plates.

According to another form of execution the treatment and the concomitant fractional distillation are insured in a continuous and progressive manner in a tower or column without plates in which are insured contrary circulations of the starting materials which have been poured into the upper part and fall by their own weight preferably in a divided state, and of ascending heating or reaction agents.

It is advantageous to fill the tower with a suitable filling as: metallic elements, pieces of bricks, calibrated pieces and the like. More particularly, this filling may be used as support for the catalyser or it may be formed of the catalyser itself or of the catalysers themselves brought to a suitable form.

The materials to be treated fall onto the filling on which they are distributed as rain and move forward in a divided state with an intensive agitation which is favorable to their contact with the ascending gaseous products in circulation.

From the top to the bottom of the tower, when the state of equilibrium is reached, a progressive variation of the temperatures is produced. The descending carbonaceous materials travel through the successive zones and undergo therein together a progressive fractional distillation and their concomitant chemical treatment.

The treatment can be effected in a single tower or column furnished with plates or in a plurality of towers or columns mounted in series, in parallel or in series-parallel and suitably connected together. In the like manner, in a column with plates, various kinds of connections of the plates with one another may be provided.

According to one of these kinds of connection the plates of the column are connected in groups of two or more so as to form a plurality of series some of which receive the progressively lightened starting materials, while others receive only fractionally distilled products and still others can receive chemical agents in a liquid state or in solution or solvents adapted, as the case may be, for purifying, refining, or activating the gaseous fractions or for extracting from these gaseous fractions hydrocarbons which have been selected by solution; the gaseous mixture circulating upwards passes through all of the plates. The single series or the several series of plates receiving the fractionally distilled products, the chemical agents and the solvents will be free of starting materials. They effect one or more separations which are superposed on the whole fractional distillation.

Again, this arrangement can also be provided only on one part of the column.

According to another arrangement concerning more particularly the case of the selective treatment in plate columns arranged in parallel the plates of the first column are provided with condensation means by mixing or by surface which receive the products refined in each stage of treatment and the products thus condensed on a plate of the first column are caused to flow onto a plate of the second column.

The plate of the second column which receives these condensed products is also provided with condensation means and connected in like manner with a plate of the following column and so on.

Certain of the subject matter herein disclosed and not claimed is embraced within the scope of claims in my continuation-in-part application Ser. No. 492,968, filed March 8, 1955.

Various examples of devices allowing of the application of the method according to the invention are shown in the appended drawings.

Figure 1 is a vertical sectional view of a plate column for the fractional splitting up and the simultaneous thermal or catalytic treatment of the materials.

Figure 2 is a sectional view of a column similar to that of Figure 1, in which particular arrangements have been provided for the catalytic treatment in the gaseous medium.

Figure 3 is a sectional view of a column without plates but furnished with an internal filling.

Figures 4 and 5 are views of plate columns provided with means for adjustment of the temperatures by a calorific exchange with the gaseous mixture before its introduction into the column.

Figure 6 shows a modification of the plate column of Figure 1 in which the plates are connected alternately together.

Figure 7 is a view of a modification in which every plate is connected with the third following one.

Figure 8 is a view of a column according to Figure 2 with a particular connection between the plates.

Figure 9 is a view of an arrangement of columns in parallel for the selective treatment of carbonaceous materials.

Figures 10 to 15 show certain advantageous arrangements which can be adopted for the elements of the preceding columns.

According to Figure 1 the apparatus for the treatment and the fractional splitting up of carbonaceous materials is formed of a chamber 20 the walls of which are adapted to the conditions of operation (temperature, pressure, chemical action or corrosion) and in which are arranged plates 21 superposed with bubbling caps 22 and downpipes 23. On the upper plate or any other plate is provided the inlet 24 for the carbonaceous materials to be treated, which may be liquids or solids in suspension in an oil. In the case of solid matter the latter can be introduced in the form of a paste but it is also possible to introduce separately the suspension liquid and the crushed solid material, the mixture taking place inside the column itself on the plate or plates on which the materials are poured.

At the upper end is a pipe 25 for the eduction of the light products. In the lower part is arranged a means for the supply of a hot fluid (flue gases, steam, inert gases, oxidizing or reducing gases, hydrogenating gases, hydrocarbons and the like), as, for instance, a pipe 27 is the outlet for the removal of the residues if any.

The products to be transformed (liquid or suspension of solids) which are preheated or non-preheated and introduced at 24 move progressively downward either through their own weight or through the action of mechanical means and fall from one plate to another through the down-pipes 23, whereby they pass successively through stages in which the physico-chemical conditions are different owing to the variations of the temperatures and possibly to the presence of catalysers in a liquid or in a gaseous medium.

In the contrary direction the gaseous mixture introduced at 26 passes through the plates 21 successively in an ascending circulation while flowing through the bubbling means 22.

By adjusting the quantity of products to be treated which are introduced at 24 at a high temperature and the quantity of the hot gaseous products introduced at 26 and possibly by using other adjusting means it is possible to establish in the column a scale of temperatures which gradually vary from one plate to another.

In each stage the liquid products are submitted to a chemical, thermal or catalytic treatment and to a separation of the light products, whether the latter come from the starting materials without any transformation or result from the treatment. In their turn, the so separated products are submitted to the chemical treatment in a gaseous medium before they reach the upper stage while passing through the bubble caps 22.

On the upper plate the heavy products which have been carried along condense and are submitted, as the case may be, to the reaction in a liquid medium, whereafter they are taken into the descending circulation through the tubes 23, while the light products continue their ascending circulation after having been mixed, if necessary, with the light products formed on the said plate.

This operation is repeated in the same manner in all the stages as well as on the plates during the descending travel of the products in the liquid state as in the free space between the level of the liquid on a plate and the plate lying immediately thereabove during the ascending travels of the products in the gaseous state.

Thus, the carbonaceous materials are submitted to successive treatments in a plurality of stages at different temperatures which correspond to the compositions of the mixture selected in the treatment, which conditions vary from one stage to another, and they are simultaneously fractionally split up and separated.

In the upper part, at 25, only the light products of the last stage of the selective treatment are collected. The residues of the heavy products, if any, collect in the lower part of the column and are removed at 27. On the different stages the intermediary products can be removed for instance at 28 and 29 in the gaseous or in the liquid state.

The products which are obtained at 25, 27, 28 and 29 are condensed, as the case may be, and, if necessary, expanded and separated from the incondensable gases introduced or formed during the successive treatments in the various stages, this being obtained by any usual suitable means.

Instead of introducing at 26 simultaneously heated gases or vapors, it is possible to use any other kind of heating for the column, either an internal or an external heating (not shown).

It is also possible to provide, at the upper part or in different stages, inlets for the introduction of liquid or gaseous products, heated or non-heated, as 30 and 31, adapted for adjusting the temperatures, promoting or directing the treatment in the corresponding stage and, if necessary, for playing the part of a catalyser.

Another device (see Figure 2) consists in a column 20 with dishes or plates 21 similar to those of Figure 1 with caps 22 and down-pipes 23, in which column, above the level of the liquid in each dish, the whole or part of the space above the upper dish or plate is provided with a catalyser 32 supported by a wire gauze 33, for instance. The vapors coming from one of the plates pass through the catalyser 32 before they reach the following plate, which promotes or activates their transformation.

One obtains thus a series of combined stage treatments in a liquid medium on the plates 21 and in a gaseous medium through the catalysers 32, the treatment in a gaseous medium acting on the already lightened products evolved from the liquid of the plate 21 lying immediately underneath and leading the treated products, after their passage through the catalyser 32, to the double treatment in the stage lying immediately above.

All the plates of the column, as shown, or only certain of the said plates comprise a catalytic zone 32. Furthermore, the plates 21 can receive suitable solid or liquid catalysers for the reaction in a liquid medium. In the different stages, as well in the zones 32 as on the plates 21, the catalysers are preferably different; they are adapted to the temperature and the composition of the mixture which reaches this stage.

As before, removals as at 28, 29 and introductions of supplementary materials as at 30, 31 can be provided.

In Figure 3 the treatment chamber is column 34 without plates or dishes. This column is simply furnished with a filling 35 supported by a perforated partition wall 36. The liquid carbonaceous materials, preheated or non-preheated, are introduced at 37 and poured into the column by a distributor 38 which causes them to fall as rain on the filling 35.

At 39 is provided an inlet for the introduction of preheated fluid (carbonaceous vapours, steam, indifferent gases, oxidizing or reducing gases); 40 is the outlet for the extraction of the residues if any, and 41 is the outlet for the eduction of the light products.

The preheated fluid introduced at 39 circulates in the column 34 through the filling 35 in counter-current to the carbonaceous materials which descend in a baffled path through the said filling 35. One obtains thus from the top to the bottom of the column a series of zones in which the temperatures vary progressively. The splitting up of the materials to be transformed is effected in the said zones and the conditions suitable for the treatment of the split up materials are also insured, this treatment acting progressively on products which are more and more lightened from the bottom to the top of the column.

The filling 35 is formed of metallic or earthen pieces which are calibrated or shaped. It can serve as a support for the catalysers which can be different in the successive zones of the column. It can also be formed of the catalyser itself or of the catalysers themselves which are provided in a form adequate to a good distribution of the fluid currents in which they are immersed.

Only the light materials reach the top of the column where they are discharged at 41. The heavy products eventually collect in the lower part and are removed at 40. Removals or additional supplies can take place at any intermediary point such as, for instance, 42, 43.

In the above described arrangements the adjustment of the temperatures in the different stages of the column is effected through the temperature and the quantity of the carbonaceous materials and of the gaseous mixture introduced at 24, 26, 37 or 39 and eventually at 28, 29, 30 and 31. Other additional internal or external adjustment means can be provided.

A means for the adjustment of the temperature consists more particularly in provoking a calorific exchange between the gaseous mixture before its introduction into the column 20 and the materials to be treated which descend and circulate in the same direction, as shown in Figures 4 and 5.

According to this arrangement (Figure 4) a nest of tubes 44 is provided in the column 20 which is similar to those of Figures 1 and 2 and bears the same reference numbers, this nest of tubes being mounted so as to extend the whole height of the apparatus, but it could also extend only through part of such height. If desired, the nest of tubes 44 passes through the plates 21 as well as through the treatment zones between the said plates.

It is fed by the manifold 45 mounted in its upper part with a gaseous mixture adapted to be introduced into the lower part of the apparatus at ordinary temperature after having been preheated by heat exchange with the products which escape from the column at 25 and enter an exchanger 46. Additional heat can be supplied if desired by a heating device 47.

The nest of tubes 44 is connected at its lower part with a manifold 48 which receives the gaseous mixture having absorbed the heat in excess evolved by the reactions in the column 20. This mixture is led, if necessary, to a superheater 49 and then introduced at 50 into the lower part of the treatment column where it passes in an ascending circulation in counter-current with the carbonaceous materials which descend from one plate to another, thus insuring the treatment and the concomitant splitting up of the said materials.

According to another form of execution (Figure 5), instead of circulating in a nest of tubes immersed in the materials being treated the gaseous mixture passes through a double walled jacket 51 formed by the wall of the column 20. This gaseous mixture, introduced into the annular space 51 at 52, circulates from top to bottom. At the lower part the mixture is led, if necessary, to a superheater 49 before it reaches the inside of the column 20.

In the above described devices which have been given only by way of non-limitative examples the superposed plates 21 are similar and directly connected in the usual manner through the bubbling means 22 and the down-tubes 23. But other arrangements are possible and one and the same column may comprise plates of different kinds connected in different manners.

In Figure 6 alternate plates are connected together by the down-tubes 53 which pass through the intervening plate. Thus, two series of plates 54, 55 are obtained which may receive different materials, the gaseous mixture flowing through all these plates.

The plates 54 receive the materials to be treated which are introduced, for instance, at 56 and pass from each plate to the next plate but one where they are submitted to the treatment and to the concomitant splitting up until they reach the lower part where the residue is extracted at 57 and led to a separator 58.

The plates 55 however receive only such materials as are introduced at 59 and the parts which have been split up in the plates 54, i. e. separated from the starting materials. More particularly, when solid materials are treated, the products circulating on the plates 55 are freed from any solid part and more particularly from the ashes and the products which can be collected in the separators 60 are not only split up and treated but also freed from the impurities or residues of the starting materials.

In a modification (Figure 7) each plate of the column 20 is connected to the next following plate but two by the down tubes 53¹ which pass through both intervening plates for connecting each plate with another, so that three groups of overlapping plates 54, 55 and 55¹ are obtained, all these plates receiving the ascending gaseous current admitted at 27, but belonging to distinct circulations of products which are submitted to different treatments.

As in Figure 6 the plates 54 receive the starting materials which are introduced at 56 and which, passing through two intervening plates between each plate and the next one, are submitted to the splitting up and to the concomitant chemical treatment. As to the plates 55 and 55¹, besides the additional materials introduced at 59, 59¹ they receive only products which have been separated from the starting materials. These products can be submitted to different treatments in each group. Thus, a cracking treatment, for instance, can be effected in the plates 55 while a refining operation or a purification is effected in 55¹ through the introduction, at 59¹, into the corresponding circulation, of suitable chemical agents (bases, acids, such as soda, potash, sulphuric acid and the like) coming from a reservoir 61. In the like manner, in 55¹ or in a fourth group of plates, solvents can be brought into the circulation in order to selectively remove certain products or hydrocarbons.

As before, the residues of the starting materials are collected in the separator 58. Those of the circulation of the split up products circulating on the plates 55 are received in the separator 60. Lastly, the products of the circulation on the plates 55¹, i. e., for instance, the residues of the refining operation, are collected in 60¹.

The light products resulting from the chemical treatment, separated and possibly refined in the same operation are removed at 25.

These arrangements can be combined with plates directly connected with one another in the usual manner, as shown in Figure 8.

In this figure, one and the same column contains plates 62 similar to those of Figure 1 and directly connected, and then plates 63 with catalysers for the treatment in a gaseous medium, these plates being also connected each one with the next following one as in Figure 2 and, furthermore, an arrangement of plates, some as at 64 with catalysers and others as at 65 without catalysers, alternately connected in a manner similar to the arrangement of Figure 6.

All the superposed plates 62 to 65 receive the gaseous mixture which is introduced at 27 and which progressively absorbs light products before leaving at 25. Separators 58 and 60 have been indicated for the removing of the residues and of the heavy oils.

Of course, any modification of the above described arrangements could be used in one and the same column, as regards the composition of the various plates as well as the kind of their connection.

Furthermore, while treatment spaces have been shown which are formed of single chambers in which the method according to the invention is applied, this method can be carried out, of course, in a plurality of chambers of similar or different form mounted in series, in parallel or in series-parallel and connected in any suitable manner.

Also, the preceding arrangements can be combined with the usual means such as towers, more particularly, in which only the splitting up is effected.

Thus, a condensation or rectification device 66 (Figure 8) with a return 67 for the products reduced to a lower grade on one or more suitable plates of the column can be added to the column 20. This device can belong to the column itself and be formed of supplementary plates arranged above the plate which receives, at 24, the carbonaceous materials to be treated. It can also be arranged independently and connected with the column 20 through a piping, if necessary with the interposition of a heat exchanger effecting the cooling of the products leaving the column 20.

An arrangement of columns mounted in parallel is shown by way of example in Figure 9 in which the selected products coming from one stage of the column are led to a suitable stage of the following column where they are treated and split up anew, the products selected in this latter column flowing to the following one and so on.

In the form of execution which has been shown, the selection of the products is insured through a condensation inside the treatment column itself by means of the device shown in Figure 12 which will be described later on, but, of course, any other condensation or separation device could be used.

The plant comprises four contiguous columns I, II, III, IV mounted in parallel and containing each four plates or dishes A, B, C, D (but, of course, any number of columns and of plates could be used). These plates are provided with bubbling means E and with down-tubes T.

On each plate of the columns I, II, III, the bubbling means E is combined with condensation means (see also Figure 12).

These bubbling and condensation means are connected in their lower part with a sloping surface F collecting the condensed products of the plate $A_I$ for instance and pouring them into a tube G plunging at H into the liquid of the plate $B_{II}$ of the following column. Each tube G is provided with a regulating cock K.

The starting materials are introduced at L into the upper part of the column I or at any other suitable point. Each column comprises, in its lower part, an inlet for hot materials M (hydrogen, steam, vapor of one of the treated products, inert gas or reducing gas and the like) and an outlet N for the extraction of the residues, and, in its upper part, an outlet O for the light products and an inlet P for suitable materials.

Furthermore, inlets for the introduction or the extraction of liquid or gaseous products can be provided in any suitable point of the treatment columns (at Q, for instance).

The carbonaceous materials to be treated, as oil, tar, a suspension of coal or lignite and the like, introduced at L into the column I fall from one plate upon the other through the down pipes T and are submitted to a sequence of treatments in various stages at increasing temperatures under the action of the products circulating upwards and bubbling on each plate through the devices E.

The gaseous products escaping from a plate, for instance, flow through $E_I$ instead of directly reaching the upper plate $A_I$. Lightened materials partially condense there and are retained there, while the gaseous products continue their travel alone, bubbling on the plate $A_I$. Thus, a first series of successive treatments is effected to which the materials are submitted while the lightened products are withdrawn from the said treatments as soon as they are formed. This first treatment can be called the first grade treatment.

The condensed products collected in $F_I$ are immediately led to the following column through $G_I$. The same is true for the whole of the other plates; the products condensed in $B_I$ pass upon $C_{II}$, the products condensed in $C_I$ pass upon $D_{II}$ and the products condensed in $D_I$ are led to the foot of the column II.

In this column II the already lightened products are submitted to a novel series of treatments in different stages which can be called the splitting up second grade treatment.

By operating on the plates of the column II in the same manner as before, the products condensed in $A_{II}$, $B_{II}$, $C_{II}$, $D_{II}$ respectively pass upon the plates $B_{III}$, $C_{III}$, $D_{III}$ respectively and reach the foot of the column III in which the third grade treatment is effected.

From the column III the products are sent, in the like manner, to the column IV which, in the example which has been chosen, is the last of the columns mounted in parallel and where a novel treatment, the fourth grade treatment, is effected. This column IV can if desired be provided with condensing or selecting means. In the appended drawing it has been supposed that it is not provided with such means but only with simple bubbling devices, all the plates or only certain of them being provided with taps R for the removal of the liquid products carried by the plates with regulating valves S.

With this arrangement it appears that in the column II only products are treated which have already been selected in the column I, while in the column III only products are treated which have been separated in the column II and so on.

In the arrangement which has been described and shown it has been supposed that the products selected on a plate of one column were sent totally or partially to a plate of the following column, but, of course, this correspondence between one plate and the other is not necessary for the carrying out of the method and the arrangement can be such that one group of plates of one of the columns corresponds to a plate or a group of plates of any one of the other columns.

The columns I, II, III, IV can be assigned to different treatments and in each stage catalysers can be used which are adapted to the special conditions of this stage. In these columns or only in certain of them the plates can be united in groups, as already indicated.

More particularly in the case of the hydrogenation of solid carbonaceous materials or of the cracking of residues, this device can advantageously be used for separating the product which have been more or less lightened from the starting carbonaceous materials and substituted for the groups of superposed plates of Figures 6 and 7 for carrying out a more selective and farther reaching treatment (more particularly a refining operation) and avoiding the necessity of using columns of a great height the construction of which involves some difficulties.

The construction of the plate columns for carrying out the method according to the invention can be similar to that of the usual distillation columns, but it can comprise certain constructive particularities such as those which will be described now.

As regards the down-tube for the passage of the liquids to the following plate (23, 53 or T), instead of being fed directly on the level of the liquid on the plate as in the case of a usual overflow pipe, the said tube is advantageously disposed so as to take the liquid in the neighbourhood of the bottom of the plate. This arrangement is more particularly advisable for the treatment of solid carbonaceous materials which, owing to their tendency to collect on the bottom of the plate, are thus better carried along towards the following plate.

The down-tube 23 (53 or T) is surrounded by a tubular element 68 (Figure 10) concentrically or eccentrically arranged and open at both ends, the lower end 69 opening near the bottom of the plate 21, while the upper end 70 is located above the level of the liquid in the said plate.

According to a modification (Figure 11) the tube 23 (53 or T) has an end bent at 71 and opening at 72 and opening near the bottom of the plate 21. An opening 73 is provided in the bend in order to avoid the siphon effect.

The bubbling means, instead of having the usual form of the distillation columns (caps with or without teeth such as 22), is formed so as to insure the distribution and the discharge of the vapor mixture leaving the lower plate near the bottom of the plate to which it belongs.

According to the form of execution shown in Figure 10 it is formed of a tubular element 74 closed in its upper part 75. On this element 74 are arranged a plurality of tubular elements 76 of small diameter which are bent and the length of which is such that they plunge into the liquid of the plate 21 and open at 77 near the bottom of this plate.

This arrangement has the advantage that it insures a high flowing speed for the gaseous mixture and an intimate contact with the materials to be treated. Furthermore, it insures a better distribution of the gaseous products in the liquid. Finally, owing to the fact that the said products arrive near the bottom of the plate, an intensive agitation which is favorable to the success of the treatment is caused in the whole liquid mass.

Figure 12 shows a modification of the bubbling means which permits of effecting the condensation of the vapours contained in the gaseous mixture and of insuring their extraction in convenient conditions which can be used more particularly in the arrangement shown in Figure 9.

Instead of being submerged in the liquid of the plate 21, as in Figure 10, the tubes 76 of the bubbling means open at 78 into the lower part of one or more bells 79 in the upper part of which are arranged the tubes 80 which are submerged in the liquid on the plate 21. These bells 79 act as separators which insure the condensation of the oils corresponding to the temperature of the plate under consideration.

After having followed the way 74—76—79—80 the gaseous products continue their travel in the liquid of the plate and then in the upper plates. The condensed oils retained in the bell 79 are collected at 81 and drawn off at 82, where they enter a separator 83 or any other device (see Figure 9). It is thus possible to obtain oils which are better selected than with the simple fractions such as 28 and 29 in Figures 1 and 2.

In case a layer of catalysers 32 (see Figure 2) is used in the zone for the passage of the gaseous mixture particular arrangements such as those of Figures 13 to 15 can also be advantageously recommended.

According to these figures the bubbling means is formed of a tube 34 closed in its upper part and on which are mounted bent tubular elements 35 having a small diameter. These elements are submerged in the liquid and open near the bottom of the plate 31. This arrangement insures the distribution of the gaseous mixture in the liquid on the plate, its leaving at a comparatively high speed and an intensive intermixing with the products to be treated.

In Figure 13 the tube 84 with its elements 85 is disposed so that its upper part is submerged in the catalyser 32 which is retained by the wire mesh 33 or any other means. Owing to this arrangement the bubbling means acts at the same time as a heat exchanger. The gaseous products absorb part of the heat evolved through the reaction in a gaseous medium in the catalyser 32, thus insuring the regulation of this reaction and returning this heat to the liquid of the lower plate.

According to Figures 14 and 15 the heat of the reaction in a gaseous medium is absorbed by the gaseous products escaping from the plate 21 and making their way towards the catalyser 32, the said products being thus heated by this absorption which takes place before the products reach the said catalyser.

In Figure 14 a tubular unit similar to the bubbling means 74—75—76 (Figure 10) and formed of a tube 86 and elements of a small diameter 87 is embedded in the catalyser 32. This tube 86 is secured to a partition wall 88. The elements 87 open into the catalyser 32 which rests either on the wall 88 or on the wire mesh 33.

In the modification according to Figure 15 double tubes 89 in the form of "glove fingers" are mounted on a partition wall 90 instead of the element 88—89. The said tubes receive the gaseous products escaping from the liquid of the plate 21 and insure their heating before they reach the catalyser and come in contact with the latter, at the cost of the heat evolved by the reaction in the gaseous medium.

The above described arrangements have been given only by way of non limitative examples. They can be modified, of course, and any other means can be used for the carrying out of the method which forms the subject matter of the present invention.

Having now particularly described and ascertained the nature of my said invention, and in what manner the same is to be performed, I declare that what I claim is:

A process for transforming carbonaceous material into useful hydrocarbons which consists in introducing in liquid form solely at the upper part of each of a sequence of columns, the carbonaceous material to be treated for gravity flow downward and introducing at the lower part of each of such sequence of columns a previously heated hydrogenating gas, bubbling such gas through the liquid carbonaceous material in its upward flow in sequence through each of a plurality of zones of each column, while regulating each such zone to predetermined temperature progressively lower from the bottom to the top of the column, in order to effect selective hydrogenation and concurrent selective fractionation thereat, condensing at each zone above the lowermost zone of each column those materials hydrogenated at the next lower and hotter zone that are carried upward in vapor form with the hydrogenating gas, diverting the condensate from each zone above the lowest zone of each column in advance of the last of the sequence of columns to enter the next lower zone of the next column of the sequence, to be subjected thereat to the bubbling action of the hydrogenating gases at such zone of such column, withdrawing from each zone of the last column of the sequence such hydrocarbons as are formed therein, and withdrawing from the top of each column those lighter hydrocarbons resulting from the action of the hydrogenating gas that has passed upward through the entire height thereof.

References Cited in the file of this patent

UNITED STATES PATENTS

| Number | Name | Date |
|---|---|---|
| 1,552,698 | Hess | Sept. 8, 1925 |
| 1,595,642 | Clark et al. | Aug. 10, 1926 |
| 1,607,043 | Benson | Nov. 16, 1926 |
| 1,608,741 | Hess | Nov. 30, 1926 |
| 1,624,848 | Snelling | Apr. 12, 1927 |
| 1,628,532 | Coultas | May 10, 1927 |
| 1,696,913 | Hessle | Jan. 1, 1929 |
| 1,780,977 | Leslie et al. | Nov. 11, 1930 |
| 1,840,158 | Cross | Jan. 5, 1932 |
| 1,934,055 | Gohr | Nov. 7, 1933 |
| 1,938,542 | Pier et al. | Dec. 5, 1933 |
| 1,947,817 | Wallis | Feb. 20, 1934 |
| 1,948,809 | Trumble et al. | Feb. 27, 1934 |
| 1,953,939 | Jones | Apr. 10, 1934 |
| 1,962,153 | Peterkin | June 12, 1934 |
| 1,986,257 | Erter | Jan. 1, 1935 |
| 2,054,777 | Ward | Sept. 15, 1936 |
| 2,088,756 | Ocon | Aug. 3, 1937 |
| 2,092,528 | Coubrough | Sept. 7, 1937 |
| 2,105,874 | Aldridge et al. | Jan. 18, 1938 |
| 2,266,359 | Edwards et al. | Dec. 16, 1941 |
| 2,295,256 | Brugma | Sept. 8, 1942 |
| 2,298,442 | Watson | Oct. 13, 1942 |
| 2,300,240 | Thomas | Oct. 27, 1942 |
| 2,300,691 | Ocon | Nov. 3, 1942 |
| 2,332,794 | Hill | Oct. 26, 1943 |